United States Patent
Herceg et al.

(10) Patent No.: US 11,233,684 B2
(45) Date of Patent: Jan. 25, 2022

(54) NON-COHERENT BACKSCATTER COMMUNICATIONS OVER AMBIENT-BASED WIRELESS SOURCE

(71) Applicant: NOKIA TECHNOLOGIES OY, Espoo (FI)

(72) Inventors: Marijan Herceg, Osijek (HR); Tomislav Matic, Osijek (HR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/250,057

(22) PCT Filed: May 14, 2018

(86) PCT No.: PCT/EP2018/062303
§ 371 (c)(1),
(2) Date: Nov. 13, 2020

(87) PCT Pub. No.: WO2019/219156
PCT Pub. Date: Nov. 21, 2019

(65) Prior Publication Data
US 2021/0226832 A1 Jul. 22, 2021

(51) Int. Cl.
*H04L 27/26* (2006.01)

(52) U.S. Cl.
CPC ...... *H04L 27/2607* (2013.01); *H04L 27/2627* (2013.01)

(58) Field of Classification Search
CPC .................. H04L 27/2607; H04L 27/2627
See application file for complete search history.

(56) References Cited

U.S. PATENT DOCUMENTS

2018/0269909 A1\* 9/2018 Reynolds ............... H04B 1/04
2021/0286043 A1\* 9/2021 Shpak .................... G01S 5/12

OTHER PUBLICATIONS

International Search Report and Written Opinion for International Application No. PCT/EP2018/062303, dated Feb. 20, 2019, 12 pages.
Yang et al.; "Backscatter Communications over Ambient OFDM Signals: Transceiver Design and Performance Analysis"; 2016 IEEE Global Communications Conference (GLOBECOM), Washington, DC, 2016, pp. 1-6.
Bi et al.; "Wireless Powered Communication Networks: An Overview"; IEEE Wireless Communications, vol. 23, No. 2; Dec. 9, 2015; pp. 10-18.

(Continued)

*Primary Examiner* — Jaison Joseph
(74) *Attorney, Agent, or Firm* — Brake Hughes Bellermann LLP

(57) ABSTRACT

A method of non-coherent ambient backscatter communication including: receiving, by a wireless device, an ambient orthogonal frequency-division multiplexing (OFDM) symbol that includes a cyclic prefix at a first portion of the OFDM symbol that is a copy of a second portion of the OFDM symbol; modulating, by the wireless device, at least part of the received ambient OFDM symbol, including: modulating either the first portion or the second portion of the ambient OFDM symbol with data; and reflecting, by the wireless device, at least the first portion and the second portion of the modulated OFDM symbol.

16 Claims, 8 Drawing Sheets

(56) References Cited

OTHER PUBLICATIONS

Huynh et al.; "Ambient Backscatter Communications: A Contemporary Survey"; IEEE Communications Surveys & Tutorials, vol. 20, No. 4; Dec. 13, 2017; pp. 2889-2922.
Alim et al.; "Backscatter MAC Protocol for Future Internet of Things Networks"; IEEE 13th International Conference on Wireless and Mobile Computing, Networking and Communications (WiMob); Rome, Italy; Oct. 9-11, 2017, pp. 1-7.
Qian et al.; "Noncoherent Detections for Ambient Backscatter System"; IEEE Transactions on Wireless Communications, vol. 16, No. 3; Mar. 2017; pp. 1412-1422.
Yang et al.; "Modulation in the Air: Backscatter Communication over Ambient OFDM Carrier"; IEEE Transactions on Communications, vol. 16, No. 3; Apr. 11, 2017; pp. 1219-1233.
Bharadia et al.; "BackFi: High Throughput WiFi Backscatter"; ACM SIGCOMM Computer Communication Review; vol. 45, No. 4; London, England; Aug. 17-21, 2015; pp. 283-296.
Liu et al.; "Coding and Detection Schemes for Ambient Backscatter Communication Systems"; IEEE Access, vol. 5; Mar. 7, 2017; pp. 4947-4953.

\* cited by examiner

NON-COHERENT BACKSCATTER COMMUNICATIONS OVER AMBIENT-BASED WIRELESS SOURCE

CROSS-REFERENCE TO RELATED APPLICATIONS

This application is a national stage entry of International Application No. PCT/EP2018/062303, filed May 14, 2018, entitled "NON-COHERENT BACKSCATTER COMMUNICATIONS OVER AMBIENT-BASED WIRELESS SOURCE" which is hereby incorporated by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services.

WiFi is a technology for wireless local area networking with devices based on the IEEE 802.11 standards.

SUMMARY

According to an example implementation, a method of non-coherent ambient backscatter communication including: receiving, by a wireless device, an ambient orthogonal frequency-division multiplexing (OFDM) symbol that includes a cyclic prefix at a first portion of the OFDM symbol that is a copy of a second portion of the OFDM symbol; modulating, by the wireless device, at least part of the received ambient OFDM symbol, including: modulating either the first portion or the second portion of the ambient OFDM symbol with data; and reflecting, by the wireless device, at least the first portion and the second portion of the modulated OFDM symbol.

According to an example implementation, an apparatus includes at least one processor and at least one memory including computer instructions, when executed by at least one processor, cause the apparatus to receive, by a wireless device, an ambient orthogonal frequency-division multiplexing (OFDM) symbol that includes a cyclic prefix at a first portion of the OFDM symbol that is a copy of a second portion of the OFDM symbol; modulate, by the wireless device, at least part of the received ambient OFDM symbol, including: modulate either the first portion or the second portion of the ambient OFDM symbol with data; and reflecting, by the wireless device, at least the first portion and the second portion of the modulated OFDM symbol.

According to an example implementation, a computer program product includes a computer-readable storage medium and storing executable code that, when executed by at least one data processing apparatus, is configured to cause the at least one data processing apparatus to perform a method of non-coherent ambient backscatter communication including: receiving, by a wireless device, an ambient orthogonal frequency-division multiplexing (OFDM) symbol that includes a cyclic prefix at a first portion of the OFDM symbol that is a copy of a second portion of the OFDM symbol; modulating, by the wireless device, at least part of the received ambient OFDM symbol, including: modulating either the first portion or the second portion of the ambient OFDM symbol with data; and reflecting, by the wireless device, at least the first portion and the second portion of the modulated OFDM symbol.

According to an example implementation, a method of non-coherent demodulation of an ambient backscatter signal includes: receiving, from a wireless device, at least part of a backscattered modulated OFDM symbol in which data has been modulated onto either a first portion of the backscattered modulated OFDM symbol that includes a cyclic prefix or a second portion of the backscattered modulated OFDM symbol, wherein the cyclic prefix at the first portion of the backscattered modulated OFDM symbol, before modulation, is a copy of the second portion of the backscattered modulated OFDM symbol; and, non-coherently demodulating the data of the backscattered modulated OFDM symbol by correlating the cyclic prefix of the backscattered modulated OFDM symbol with the last portion of the backscattered modulated OFDM symbol.

According to an example implementation, an apparatus includes at least one processor and at least one memory including computer instructions, when executed by the at least one processor, cause the apparatus to: receive, from a wireless device, at least part of a backscattered modulated OFDM symbol in which data has been modulated onto either a first portion of the backscattered modulated OFDM symbol that includes a cyclic prefix or a second portion of the backscattered modulated OFDM symbol, wherein the cyclic prefix at the first portion of the backscattered modulated OFDM symbol, before modulation, is a copy of the second portion of the backscattered modulated OFDM symbol; and, non-coherently demodulate the data of the backscattered modulated OFDM symbol by correlating the cyclic prefix of the backscattered modulated OFDM symbol with the last portion of the backscattered modulated OFDM symbol.

According to an example implementation, a computer program product includes a computer-readable storage medium and storing executable code that, when executed by at least one data processing apparatus, is configured to cause at least one data processing apparatus to perform a method of non-coherent demodulation of an ambient backscatter signal including: receiving, from a wireless device, at least part of a backscattered modulated OFDM symbol in which data has been modulated onto either a first portion of the backscattered modulated OFDM symbol that includes a cyclic prefix or a second portion of the backscattered modulated OFDM symbol, wherein the cyclic prefix at the first portion of the backscattered modulated OFDM symbol, before modulation, is a copy of the second portion of the backscattered modulated OFDM symbol; and, non-coherently demodulating the data of the backscattered modulated OFDM symbol by correlating the cyclic prefix of the backscattered modulated OFDM symbol with the last portion of the backscattered modulated OFDM symbol.

The details of one or more examples of implementations are set forth in the accompanying drawings and the description below. Other features will be apparent from the description and drawings, and from the claims.

DETAILED DESCRIPTION

Figure 1:
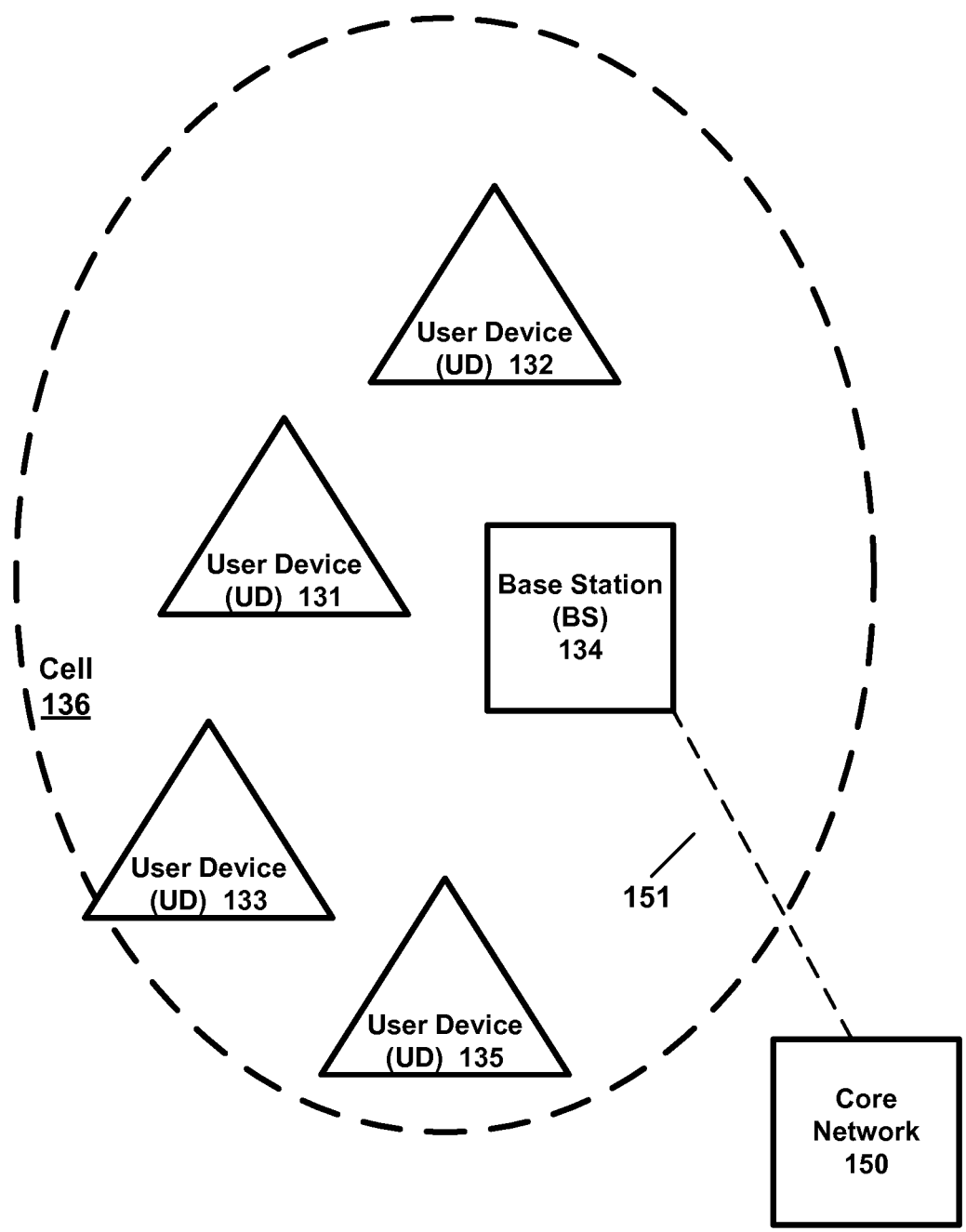
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP) (e.g., such as a 802.11 or WiFi AP, or other AP), an enhanced Node B (eNB), a 5G gNB, or a network node. At least part of the functionalities of an access point (AP), base station (BS) or (e)Node B (eNB) may also be carried out by any node, server or host which may be operably coupled to a transceiver, such as a remote radio head. Thus, the terms, BS, AP, eNB, gNB, or network node may be used interchangeably herein. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a 51 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example implementations may be applied to a wide variety of wireless technologies or wireless networks, such as LTE, LTE-A, 5G, cmWave, and/or mmWave band networks, IoT, MTC, eMTC, eMBB, URLLC, IEEE 802.11 or WiFi networks, etc., or any other wireless network or wireless technology. These example networks, technologies or data service types are provided only as illustrative examples.

Due to the increasing number of wirelessly connected devices or gadgets (e.g., due to the Internet-of-Things (IoT) paradigm), new energy efficient communication techniques and devices are being developed. According to an example implementation, ambient backscatter communication may be used as a low power communication technique in which a backscatter device (e.g., a wireless sensor node) may receive an ambient (or surrounding) wireless signal (e.g., that may have been transmitted to another wireless device), and then may reflect the received ambient signal, which may be referred to as backscatter communications or ambient backscatter communications. For example, ambient backscatter communications may take advantage of existing or surrounding wireless signals by reflecting the ambient or existing wireless signals to communicate between devices while using very little power. Thus, for example, ambient (or surrounding) wireless signals may be repurposed into both a source of power (e.g., to power one or more electronic devices on a wireless sensor node or wireless backscatter device) and a communication medium. According to an example embodiment, ambient backscatter communication may allow a backscatter device to reflect a received ambient signal while modulating data onto the reflected signal. For example, the reflected ambient signal may be modulated using active (or switched) load modulation in which the load of the antenna (of the transmitting backscatter device) is varied or changed, which may allow different data values (e.g., different phases) to be applied to the reflected signal, e.g., such as either an in-phase bit or signal, or an out-of-phase bit or signal (in the simple case of a bi-polar signal), depending on the load applied to the antenna. According to an example embodiment, a wireless device (e.g., a backscatter device) may transmit or transfer data to an access point (AP), BS or other network node by modulating ambient RF (radio frequency) carriers such as orthogonal frequency-division multiplexing (OFDM) signals in WiFi.

In many OFDM communication systems, including ambient OFDM backscatter communications, channel estimation is typically used to provide a wireless receiver with channel information (e.g., a change in amplitude and/or phase for a channel between the two devices), e.g., to allow the receiver to demodulate the received OFDM signal. However, due to the low power nature of backscatter communication devices, providing channel estimation for backscatter communication systems may consume significant power, which may be undesirable. For example, channel estimation may be used between a wireless network node (e.g., an AP, BS, or other network node that may receive a reflected ambient signal) and a transmitting backscatter communications (BC) node to provide channel estimation at AP, which additionally consumes BC node power, because the BC node may typically need to send a training sequence (training signals, reference signals, or other signals to allow the channel to be estimated) in order for the AP to estimate the channel between them. This process additionally consumes more energy from BC node due to the sending of training sequence. Furthermore, in some cases, channel estimation methods may increase hardware complexity and power consumption at the AP. According to an example implementation, a BC node may be any wireless device (e.g., UE, user device, wireless terminal, WiFi client, or other wireless device) that is capable of reflecting ambient signals. As noted, the network node that may receive the reflected signal may include, e.g., an AP, a BS, or other wireless node (such as a WiFi AP or 5G gNB, as illustrative examples). Some of the example embodiments described herein may refer to an access point (AP) or a base station (BS), but other network nodes may be used.

Therefore, various example embodiments describe an ambient backscatter communication based on ambient OFDM signals, without the need for channel estimation between a backscatter communications (BC) node and a network node (e.g., AP or BS), which can be WiFi router, or mobile device or any other device whose communication is based on OFDM signals. Thus, various example embodiments may enable efficient backscatter communication from the BC node to the network node that is powered by an ambient network node source (e.g., ambient WiFi source or ambient 5G source), without the need of channel state information (CSI) at the network node (e.g., WiFi AP or 5G gNB). Thus, for example, a network node (e.g., WiFi AP, or 5G BS/gNB, or other network node) may perform non-coherent (e.g., without use of channel state information at the receiver, and/or without a need for training signals to determine the channel) demodulation of a received backscattered modulated OFDM signal from a BC node. In this manner, a more power-efficient backscatter communication system is provided, e.g., that may avoid use of a training sequence to allow the backscatter signal receiving device to learn the channel or channel state.

Figure 2:
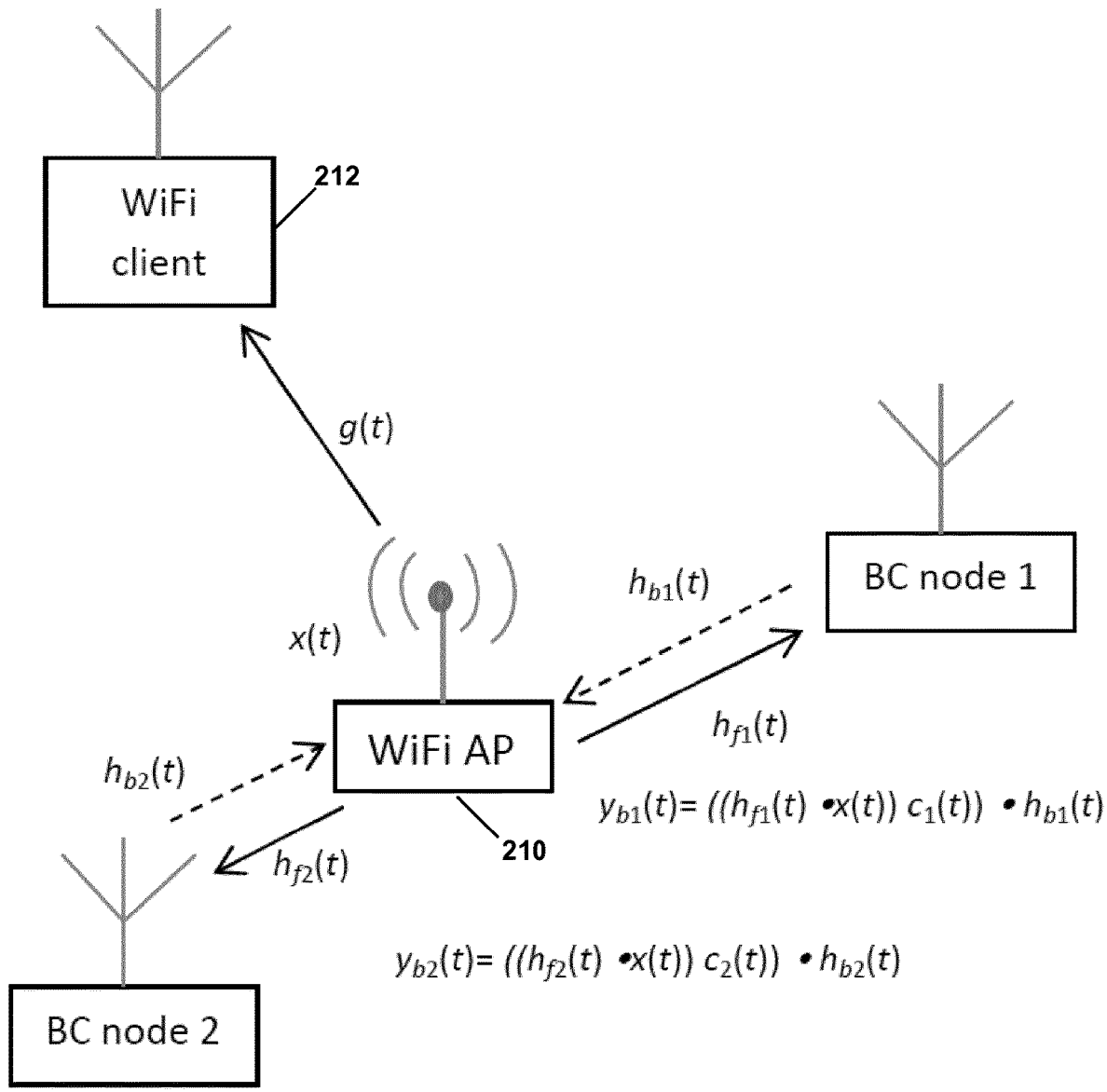
FIG. 2 is a diagram illustrating a wireless network according to another example embodiment.

FIG. 2 is a diagram illustrating a wireless network according to another example embodiment. In this illustrative example, a WiFi AP 210 (an example network node) may be transmitting a signal to a WiFi client 212. This transmitted signal may be received as an ambient signal by other wireless devices, including backscatter communications (BC) node 1, and BC node 2. Each of the BC nodes may reflect the ambient wireless signal (x(t)), and may modulate the reflected signal via load modulation, to transmit information to the receiving node (e.g., WiFi AP 210) that receives the reflected signal.

The following equations describe some aspects of the diagram of FIG. 2:

g(t)—impulse response of channel between WiFi AP 210 and WiFi client 212.

x(t)—OFDM symbol transmitted by WiFi AP 210 (with respect to the BC nodes, this is an ambient OFDM symbol that is received by BC node 1 and BC node 2).

$h_{bk}(t)$—backward channel impulse response between BC node k and WiFi AP 210 (where k is an index that identifies one of the BC nodes, e.g., identifying either BC node 1 or BC node 2 in this example).

$h_{fk}(t)$—forward channel impulse response between BC node k and WiFi AP 210.

$c_k(t)$—Baseband signal transmitted by BC node k.

$y_{bk}(t)$—received backscattered signal at WiFi AP 210 from BC node k.

·—convolution operator.

$$y_{b1}(t)=((h_{f1}(t)\cdot x(t))c_1(t))\cdot h_{b1}(t) \quad\quad (Eq.\ 1)$$

Thus, as shown in FIG. 2 and described in the above equations, x(t) is the ambient signal transmitted by the WiFi AP 210. Thus, the ambient signal received by the BC node 1 is: $h_{f1}(t)\cdot x(t)$, which is the ambient transmitted signal that is modified (or distorted) based on the forward channel impulse response. The BC node 1 may reflect this received signal (also known as ambient backscatter communication), and modulate the reflected ambient signal based on a data or baseband signal $c_1(t)$. Thus, after being modified (or distorted) by the reverse channel ($h_{b1}(t)$), the WiFi AP 210 receives the modulated backscattered (or reflected) signal $y_{b1}(t)$, as shown by Eq. 1. Thus, the modulated backscattered signal received by the WiFi AP 210 may have an amplitude and phase that are modified due to the impulse response of the channel between the BC node 1 and the WiFi AP 210.

Many OFDM systems may typically provide training signals or reference signals to allow the receiving node (e.g., WiFi AP 210 in this example) to determine the channel (or channel impulse response) to allow the receiving node (e.g., WiFi AP 210) to demodulate the modulated backscattered signal. However, transmitting and receiving a training signal to determine a channel (channel state information or channel impulse response), may consume significant power, which may be very disadvantageous for backscatter communication systems, which are typically very low power. Thus, according to an example embodiment, techniques are provided that allow non-coherent demodulation of a modulated backscattered signal, without requiring channel or channel state information at the receiving node.

Figure 3:
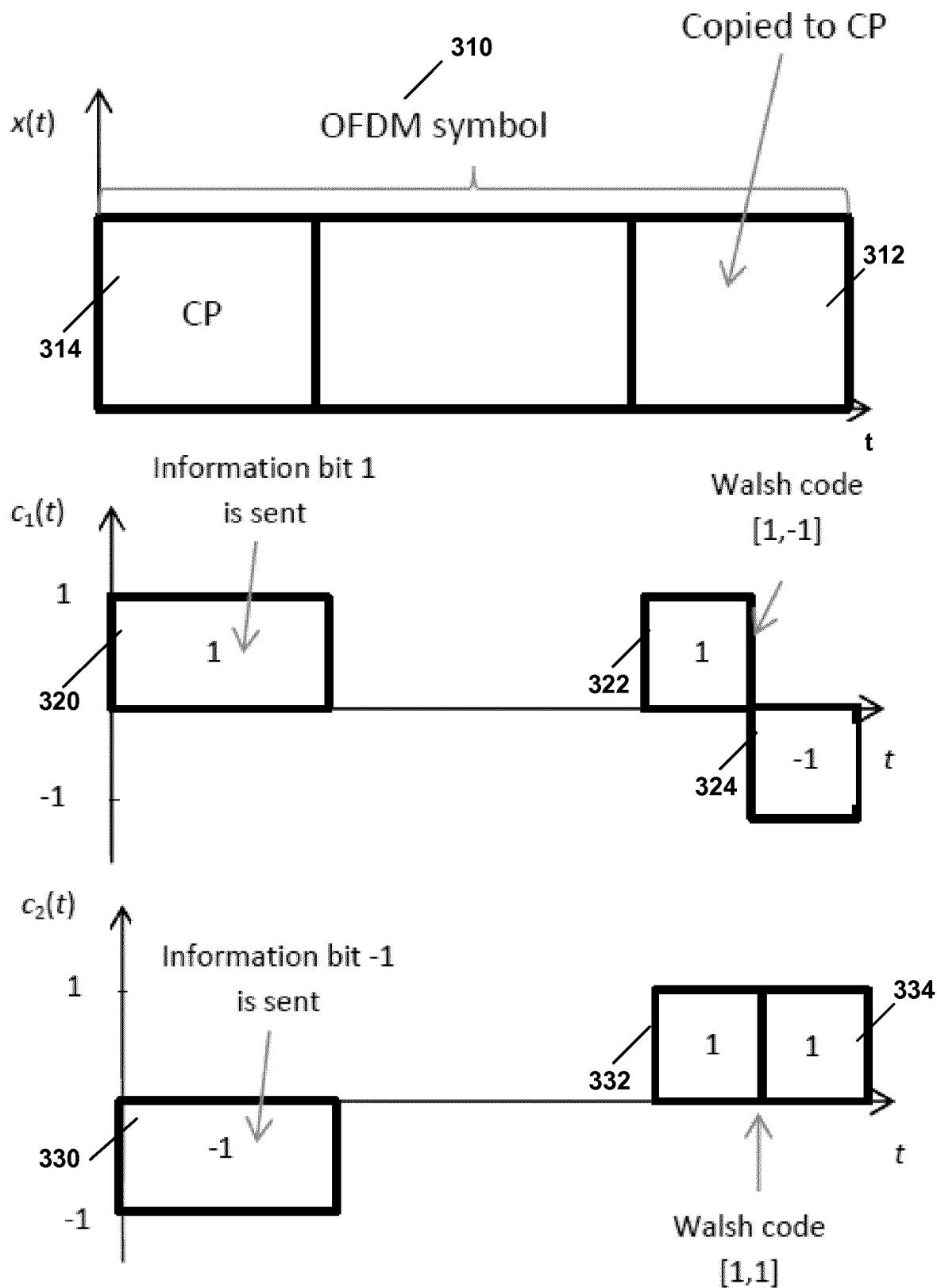
FIG. 3 is a signal timing diagram corresponding to the diagram of FIG. 2 according to an example embodiment.

FIG. 3 is a signal timing diagram corresponding to the diagram of FIG. 2 according to an example embodiment. In FIG. 3, Y (or vertical) axes are amplitude of signals, and X (or horizontal) axes are time (t). WiFi AP 210 transmits an OFDM symbol 310 as x(t). OFDM symbol 310 (x(t)) is received as an ambient OFDM symbol by both backscatter communication nodes, BC node 1 and BC node 2. At least part of the ambient OFDM symbol 310 is reflected to WiFi AP 210 by BC node 1 and BC node 2, including information (e.g., an information bit) and an orthogonal code, e.g., Walsh code (to identify the transmitting BC node) that are modulated onto separate portions of the reflected OFDM symbol.

Ambient OFDM symbol 310 may include, e.g., a cyclic prefix (CP) at a first portion 314 of the OFDM symbol 310, which is a copy of a second (e.g., last) portion 312. Thus, both portion 314 and portion 312 are copies of each other, e.g., CP at portion 314 and portion 312 of OFDM symbol 310 have the same time varying signal within the OFDM symbol 310. A CP may be sometimes used to provide an additional guard period, e.g., to reduce inter-symbol interference when transmitting the symbol.

BC node 1 may modulate (e.g., via switched load modulation) at least part of ambient OFDM symbol 310 based on baseband signal $c_1(t)$. In an example embodiment, baseband signal $c_1(t)$ may include an information (or data) bit at 320 (which may overlap in time the CP at portion 314 of ambient OFDM symbol 310), and may include an orthogonal (e.g., Walsh) code at 322, 324 (which may overlap in time with portion 312 of ambient OFDM symbol). Thus, BC node 1 may modulate (e.g., via switched load modulation) the CP at portion 314 of ambient OFDM symbol 310 based on data signal (or data bit) 320. Also, BC node 1 may modulate portion 312 of ambient OFDM symbol 310 with or based on an orthogonal code (e.g., Walsh code), including bits 322 and 324, which may be associated with or identify BC node 1. In the example shown in FIG. 3, data signal 320 is a 1, and bits 322 and 324 of the Walsh code are [1, −1], respectively. In an alternative (not shown) of baseband signal $c_1(t)$, the Walsh code 322, 324 may be provided first (in time), and the data bit 320 may come last. After modulating at least part of the ambient OFDM symbol 310, BC node 1 may reflect (or transmit via backscatter communication) the modulated ambient OFDM symbol (or at least part thereof) to the WiFi AP 210, for example.

According to an illustrative example embodiment, a BC node (e.g., BC node 1, or BC node 2) may reflect CP as is (no phase change) to transmit a data bit of 1, and, the BC node reflects the CP with a 180 degree phase change (which may be considered an inverted CP) to transmit a −1. By changing the impedance or load of the antenna, which may be referred to as switched load modulation, the BC node may modulate a portion (or all) of the reflected signal, e.g., by selectively applying a 180 degree phase change to provide a bit of −1, and doing nothing (not changing the phase, or a phase change of zero degrees) to apply a bit of 1, for example. This is merely one example, and other modulation techniques may be used. This allows the BC node to transmit data (either 1 or −1), as a backscatter transmission, which is the reflected ambient CP received from a WiFi AP 210. This is merely one illustrative example. Load modulation by the BC node may be used to apply or modulate the CP of the ambient OFDM signal with other phases.

A similar process may be performed by BC node 2, e.g., to modulate at least part (e.g., portion 314) of ambient OFDM symbol 310 with data and modulate a part (e.g., portion 312) of ambient OFDM symbol 310 with a Walsh code, and then backscattering (or reflecting) the modulated ambient OFDM symbol to the WiFi AP 210. BC node 1 may use a first Walsh code (e.g., [1, −1]) to identify BC node 1, and BC node 2 may use a second (a different) Walsh code (e.g., [1, 1]) to identify BC node 2.

Thus, referring to FIG. 3, BC node 2 may modulate (e.g., via switched load modulation) at least part of ambient OFDM symbol 310 based on baseband signal $c_2(t)$. In an example embodiment, baseband signal $c_2(t)$ may include an information (or data) bit at 330, and may include an orthogonal (e.g., Walsh) code at 332, 334 (which may overlap in time with portion 312 of ambient OFDM symbol). Thus, BC node 2 may modulate (e.g., via switched load modulation) the CP at portion 314 of ambient OFDM symbol 310 based on data signal (or data bit) 330. Also, BC node 2 may modulate portion 312 of ambient OFDM symbol 310 with or based on an orthogonal code (e.g., Walsh code), including bits 332 and 334, which may be associated with or identify BC node 2. In the example shown in FIG. 3, data signal 330 is a −1, and bits 332 and 334 of the Walsh code are [1, 1], respectively.

As noted, a two-bit Walsh code may be used to identify four different BC nodes, e.g., to allow for multiple access or multiple BC nodes. In this example, a Walsh code of [1, −1] may be associated with or may identify BC node 1, and Walsh code [1, 1] may be associated with or may identify BC node 2. Thus, in this example, BC node 1 modulates CP at portion 314 of ambient OFDM symbol 310 with a data (or information) bit 320, and modulates portion 312 with a Walsh code 322, 324 associated with BC node 1. However, the modulation of portions 314 and 312 with data and a Walsh code, respectively, may be reversed. Thus, alternatively, BC node 1 may modulate CP at portion 314 with the Walsh code, and may modulate portion 312 of the ambient OFDM symbol 310 with the data bit 320. Likewise, alternatively, BC node 2 may modulate CP at portion 314 with the Walsh code, and may modulate portion 312 of the ambient OFDM symbol 310 with the data bit 330.

Thus, for example, in general, an ambient OFDM symbol 310 may be received by BC node 1, and a first portion (either 314 or 312) of the ambient OFDM symbol 310 may be modulated with data, while a second portion (either 312 or 314, whichever is not modulated with data) of the ambient OFDM symbol 310 may be modulated with a Walsh code to identify the transmitting BC node.

Note, that one or more example embodiments may use orthogonal (e.g., Walsh) codes to support multiple access (multiple BC nodes), where different Walsh codes may be used to identify different BC nodes. In addition, multiple access can also be performed or supported in a time division multiple access (TDMA) manner, in which each BC node may transmit (reflect an ambient signal) during a different time slot, e.g., transmit during a different OFDM symbol, in order to allow a receiving node (e.g., AP or gNB or other node) to distinguish transmissions from different BC nodes.

Thus, according to an example embodiment as shown in FIGS. 2-3, two BC nodes (e.g., BC sensor nodes), one WiFi client and one WiFi AP are shown (FIG. 2). Initially, WiFi AP may send an OFDM symbol 310 x(t) to the WiFi client. OFDM symbol 310 may be received as an ambient OFDM symbol by BC nodes 1 and 2. The ambient OFDM symbol 310 may be used by each of the two BC nodes (BC node 1, BC node 2) as a carrier for its data transmission. Without loss of generality, the example operation of BC node 1 is considered. As can be seen from FIG. 2, x(t) is transmitted via forward channel $h_{f1}(t)$ to BC node 1. Then, the BC node 1 modulates the received (ambient) signal with waveform $c_1(t)$ using a load modulation, e.g., switched load impedance, as follows (see FIG. 3 for signal timing diagrams); the CP at portion 314 of received ambient OFDM symbol may be modulated with bipolar data (e.g., either 1 or −1), while the portion 312 of the OFDM symbol 310, which is equal to (or the same as) the CP at portion 314, is modulated with corresponding Walsh code (in the case of BC node 1 it is [1, −1]). The modulated signal is then reflected (transmitted via backscatter communication) to the WiFi AP 210 via backward channel $h_{b1}(t)$. Also according to an example embodiment, at least in some cases, if an OFDM symbol duration is less than channel coherence time, the whole (entire) OFDM symbol will experience the same channel conditions and therefore, efficient non-coherent (without estimation of $h_{f1}(t)$ and $h_{b1}(t)$) demodulation of backscattered signal can be performed at the receiving node (e.g., WiFi AP 210).

Thus, with reference to FIGS. 2-3, according to an example embodiment, a non-coherent ambient backscatter communication scheme is provided, and may be based on ambient OFDM signals. Generally, during transmission of the backscattered OFDM symbol, the whole (or entire) OFDM symbol experiences the same channel condition (e.g., both portions 314 and 312 of the backscattered OFDM symbol experience same channel, including the same phase change). Therefore, example embodiments use the fact that the cyclic prefix (CP) at portion 314 of OFDM symbol 310 is a copy (or copied version) of the last portion 312 of the same OFDM symbol 310. As noted, the BC node reflects the ambient OFDM symbol 310 (or at least portions 312 and 314 of the OFDM symbol 310), and thus, the backscattered signal includes both portions 314 and 312, which have been modulated with data or a Walsh code. Thus, because CP at the first portion 314 is a copy of the last portion 312 of the ambient OFDM symbol (which is modulated and reflected), the last portion 312 (the portion of the reflected ambient OFDM symbol that is not modulated with data) of the OFDM symbol 310 can be used as a template signal for correlation with data bearing signal (first portion 314 of the reflected ambient OFDM symbol 310). Furthermore, based on the use of Walsh codes, for example, a code division multiple access (CDMA) method can be implemented, e.g., by modulating the CP at portion 314 with data signal and by modulating last portion 312 of the same OFDM symbol by an orthogonal code, e.g., Walsh code. Then, in this example, the last portion 312 of the received backscattered modulated OFDM symbol may be multiplied with the same orthogonal code (e.g., to confirm identity of the transmitting BC node, and also this operates to remove the Walsh code from the last portion 312 of the received reflected/backscattered OFDM symbol).

Thus, after multiplying the last portion 312 of the received backscattered modulated OFDM symbol with the orthogonal code, the original CP (of the ambient OFDM symbol 310) remains, and is correlated with the data modulated first portion 314 of the received backscattered modulated OFDM symbol to demodulate the data. Note that the phases of the portions 312 and 314 are aligned, e.g., because the entire reflected ambient OFDM symbol (including both portions 314 and 312) are subjected to the same distortion or channel (e.g., phase change). This allows a correlation of these two portions 314 and 312 in the received backscattered modulated OFDM symbol (e.g., after removal or demodulation of any Walsh code within portions 312, 314) to non-coherently demodulate the data, without using (or without requiring use of) channel information at the receiving node (e.g., AP 210). By using last portion (after removing the Walsh code) of the backscattered modulated OFDM symbol as a template for correlation with data bearing CP portion, no channel estimation is needed at the backscatter receiving node (e.g., WiFi AP 210 or 5G gNB), because the whole OFDM symbol experienced the same channel condition (meaning that both the data bearing first portion and the second (e.g., last) portion of the backscattered modulated OFDM symbol experience same distortion or phase shift). In this manner, transmission and processing of a training signal may be avoided, since non-coherent demodulation is provided, which may significantly decrease both the power consumption (e.g., because no training sequence is needed) and hardware complexity.

In an example embodiment, a BC node (or backscatter transmitting node) modulates ambient OFDM signal with data signal by using load modulation (e.g., switched load modulation) and a receiving node (e.g., AP 210, gNB, or other network node) non-coherently demodulates received backscatter modulated (reflected) signal from BC node. Furthermore, BC node may modulate a CP at a first portion 314 of ambient OFDM symbol 310 with a data signal using load modulation, while a second portion (e.g., last portion 312) of ambient OFDM symbol 310 is modulated with a Walsh code, unique for particular transmitting BC node. Then, the receiving node demodulates the backscattered modulated (reflected) signal by multiplying the last (or second) portion (which was modulated with a Walsh code associated with backscatter transmitting node) of received backscattered signal with the same Walsh code, in order to distinguish a particular user, and which also removes the Walsh code modulation from such last portion 312. Subsequently, the received CP in the first portion 314 of the backscattered modulated OFDM signal 310 is time delayed and correlated with the resulting last portion 312 (after removal/demodulation of Walsh code) of the backscattered modulated (reflected) OFDM symbol 310 in order to non-coherently demodulate the data signal transmitted by particular backscatter transmitting node or BC node.

Figure 4:
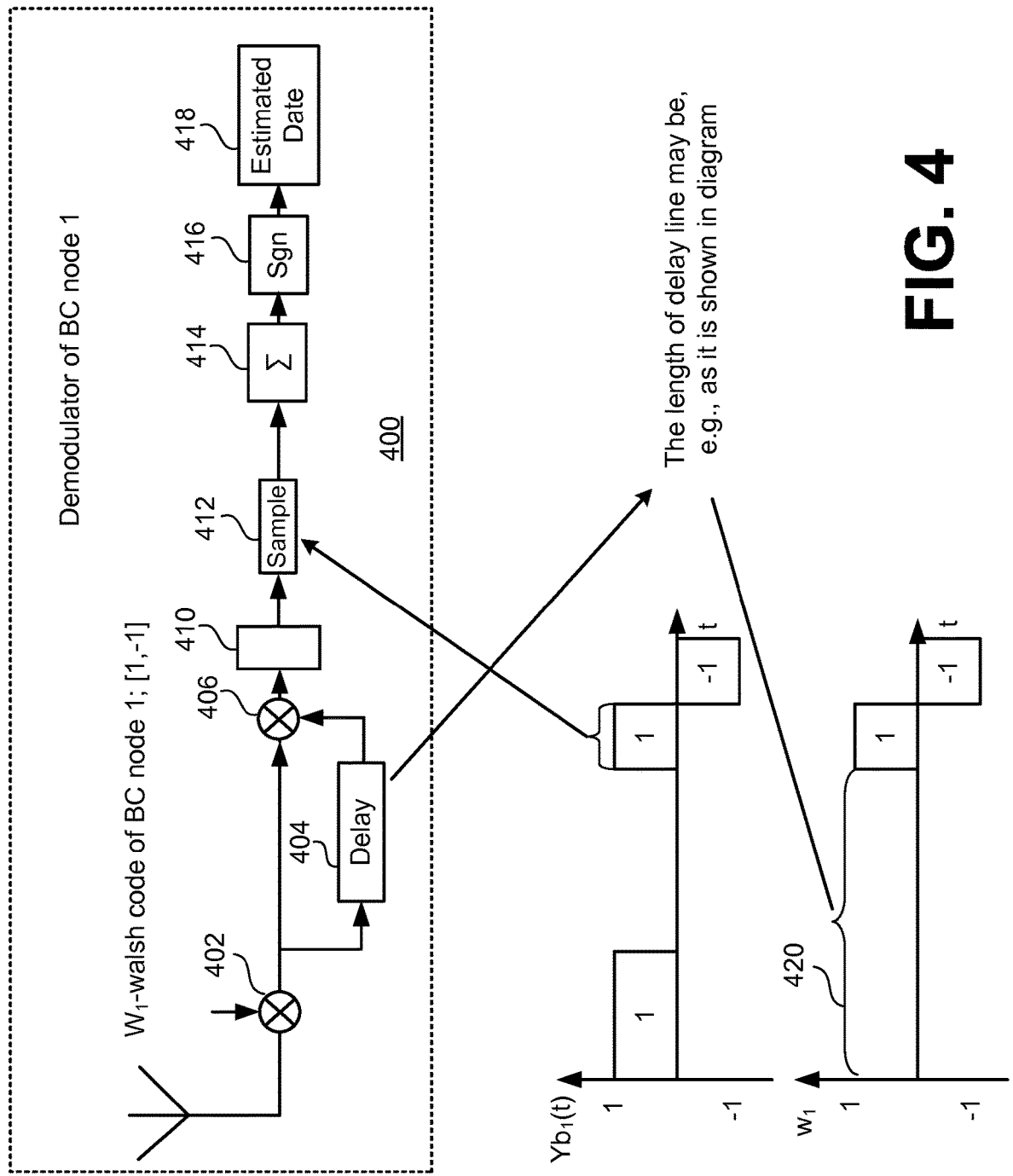
FIG. 4 is a diagram illustrating a demodulator that may be used to demodulate a backscattered modulated signal according to an example embodiment.

FIG. 4 is a diagram illustrating a demodulator 400 that may be used to demodulate a backscattered modulated signal according to an example embodiment. As it can be seen, the received backscattered signal $y_{b1}(t)$ is first multiplied with corresponding Walsh code Wi by multiplier 402 in order to distinguish BC node 1 from other users, and then correlation with CP and last portion of backscattered signal is performed in order to estimate the data sent by BC node 1. Notice that the MA (multiple access, or multiple BC nodes) is enabled in the direct sequence spread spectrum manner based on use of a different Walsh code for different BC nodes within a cell.

As shown in FIG. 4, the Walsh code for BC node 1 is multiplied by the received backscattered OFDM symbol to confirm the signal is reflected by BC node 1. Also, the first portion 314 (e.g., which has been modulated with data) of received backscattered OFDM symbol is delayed (by delay 404) and correlated with the second portion 312 (which has the Walsh code removed). Correlation is performed based on the multiplication by multiplier 406 of delayed first portion 314 with last portion 312, and integration by integrator 410. The output is sampled by sampler 412, and summed by summer 414, and passed through a signum function 416 to output estimated data at 418. The signum function 416, for example, outputs a 1 if the output from the summer 414 is greater than 0, and to output a −1 if the output of the summer 414 is less than 0. Thus, the estimated data is either a 1 or a −1.

Also, as shown in FIG. 4, the delay at delay 404 of 314 (shown as delay 420) may be used to delay the first portion (or CP) 314 until it overlaps with the second (or last) portion 312 (after removal of the Walsh code via multiplier 402). This allows the correlation to be performed as described, without requiring channel information at the receiving node.

Figure 5:
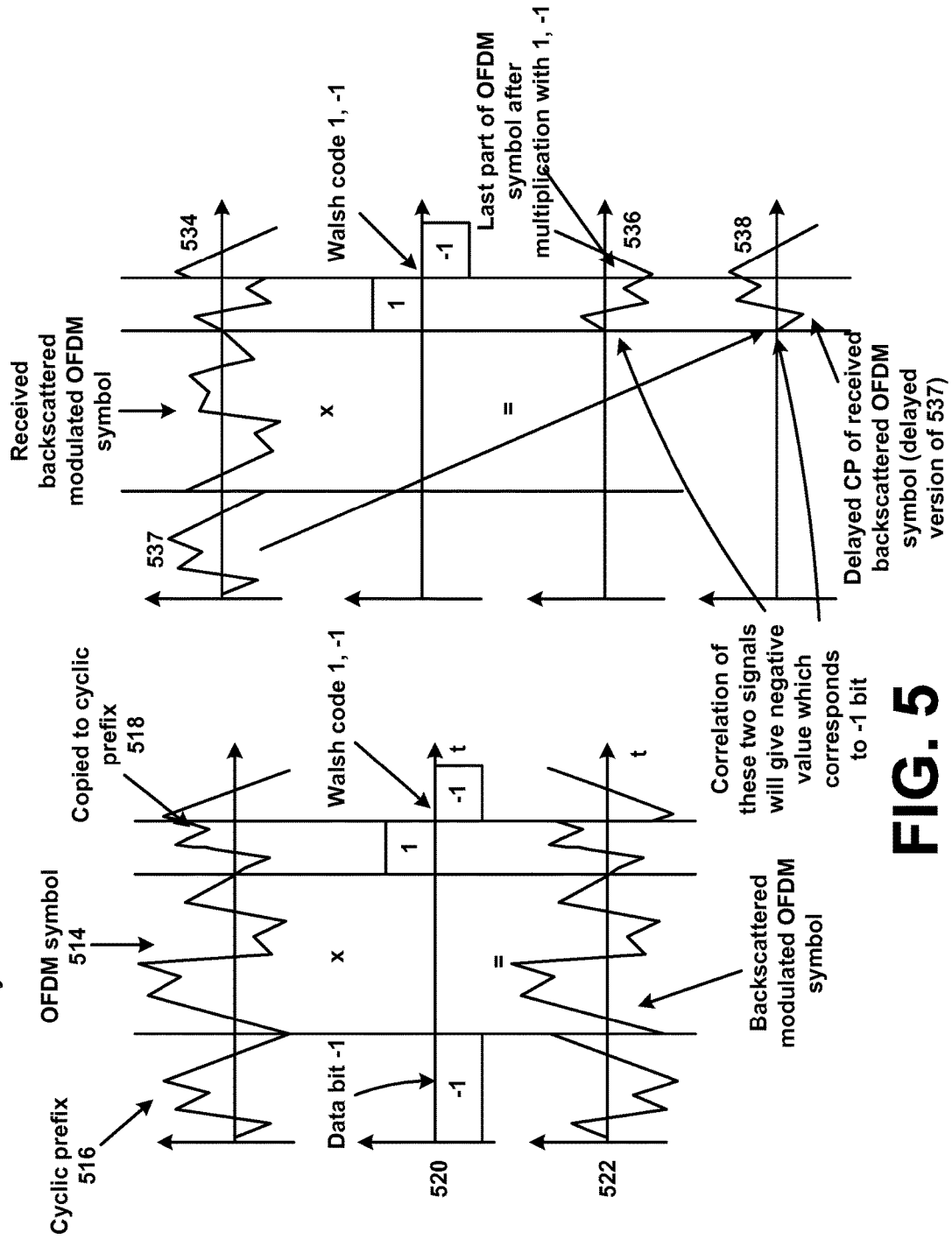
FIG. 5 is a diagram illustrating modulation of an ambient OFDM symbol, and demodulation of a modulated backscattered OFDM symbol according to an example embodiment.

FIG. 5 is a diagram illustrating modulation of an ambient OFDM symbol, and demodulation of a modulated backscattered OFDM symbol according to an example embodiment. At 510, example operations are shown for BC node 1 to modulate an ambient OFDM symbol. At 530, example operations are shown for demodulation of a modulated backscattered OFDM symbol. With reference to 510, ambient OFDM symbol 514 includes a cyclic prefix 516 and a last portion 518, where the cyclic prefix at 516 is a copy of the last portion 518. At 520, 522, the ambient OFDM symbol 514 is modulated by BC node 1 multiplying the data bit (−1) at 520 by the first portion 516 (which is the cyclic prefix), and by multiplying the last portion 518 by the Walsh code at 520, to obtain the backscattered modulated OFDM symbol.

With reference to the non-coherent data demodulation at 530, the last portion 534 of the received backscattered modulated OFDM symbol is multiplied by the Walsh code [1, −1]. The resulting last portion 536 is then correlated with the delayed version 538 of the first portion 537 of the backscattered modulated OFDM symbol, to obtain or demodulate the data (either a 1, or a −1).

Some example embodiments are now described.

Figure 6:
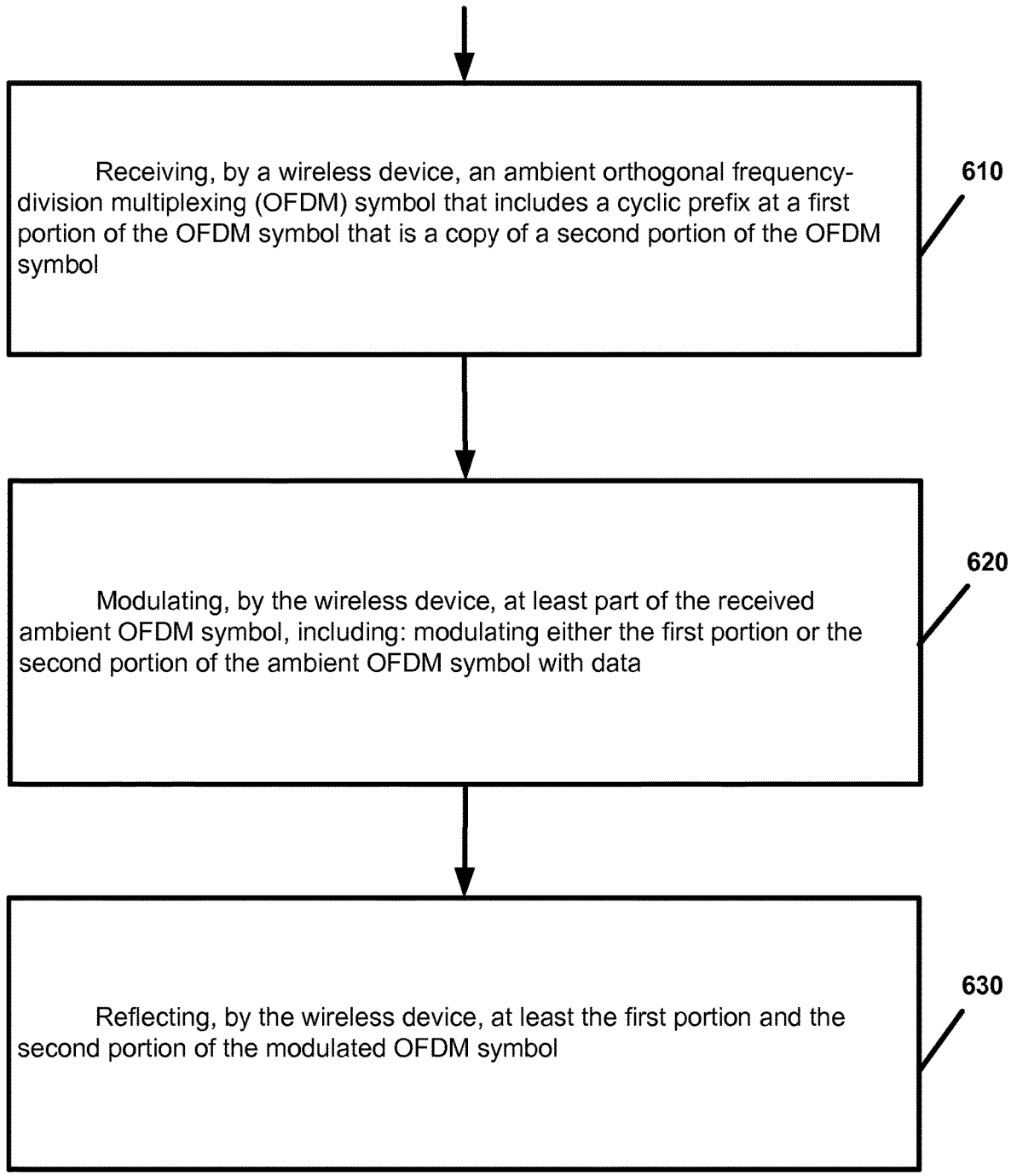
FIG. 6 is a flow chart illustrating operation of non-coherent ambient backscatter communication according to an example embodiment.

Example 1. FIG. 6 is a flow chart illustrating operation of non-coherent ambient backscatter communication according to an example embodiment. Operation 610 includes receiving, by a wireless device, an ambient orthogonal frequency-division multiplexing (OFDM) symbol that includes a cyclic prefix at a first portion of the OFDM symbol that is a copy of a second portion of the OFDM symbol. Operation 620 includes modulating, by the wireless device, at least part of the received ambient OFDM symbol, including: modulating either the first portion or the second portion of the ambient OFDM symbol with data. Operation 630 includes reflecting, by the wireless device, at least the first portion and the second portion of the modulated OFDM symbol.

Example 2. According to an example embodiment of the method of example 1, wherein the modulating further comprises: modulating one of the first portion or the second portion of ambient OFDM symbol, which is not modulated with data, with an orthogonal code associated with the wireless device.

Example 3. The method of any of examples 1-2 wherein the modulating comprises: performing active load modulation to modulate at least part of the ambient OFDM symbol.

Example 4. The method of any of examples 1-3 wherein the modulating and reflecting comprise: reflecting at least part of the received ambient OFDM symbol, and performing active load modulation for an antenna of the wireless device to modulate at least part of the reflected ambient OFDM symbol.

Example 5. The method of any of examples 1-4 wherein the modulating comprises at least: modulating the cyclic prefix at the first portion of the ambient OFDM symbol with data.

Example 6. The method of any of examples 1-5 wherein the modulating further comprises: modulating the second portion of the ambient OFDM symbol with an orthogonal code associated with the wireless device.

Example 7. The method of any of examples 1-6 wherein the modulating comprises at least: modulating the second portion of the ambient OFDM symbol with data.

Example 8. The method of any of examples 1-7 wherein the modulating further comprises: modulating the cyclic prefix at the first portion of the ambient OFDM symbol with an orthogonal code associated with the wireless device.

Example 9. The method of any of examples 1-8 wherein the modulating a portion of the ambient OFDM symbol with data comprises: performing active load modulation to modulate a portion of the ambient OFDM symbol by modifying a phase of the ambient OFDM symbol.

Example 10. The method of any of examples 1-9 wherein the modulating a portion of the ambient OFDM symbol with an orthogonal code comprises: performing active load modulation to modulate a portion of the ambient OFDM symbol with a Walsh code that is associated with the wireless device.

Example 11. The method of any of examples 1-10 wherein non-coherent demodulation of the data of the backscattered OFDM symbol may be performed based on a correlation of the cyclic prefix at the first portion of the modulated OFDM symbol with the second portion of the modulated OFDM symbol, without requiring use of channel estimation.

Example 12. An apparatus comprising at least one processor and at least one memory including computer instructions, when executed by the at least one processor, cause the apparatus to: receive, by a wireless device, an ambient orthogonal frequency-division multiplexing (OFDM) symbol that includes a cyclic prefix at a first portion of the OFDM symbol that is a copy of a second portion of the OFDM symbol; modulate, by the wireless device, at least part of the received ambient OFDM symbol, including: modulate either the first portion or the second portion of the ambient OFDM symbol with data; and reflect, by the wireless device, at least the first portion and the second portion of the modulated OFDM symbol.

Example 13. The apparatus of example 12 wherein causing the apparatus to modulate further comprises causing the apparatus to: modulate one of the first portion and the second portion of ambient OFDM symbol, which is not modulated with data, with an orthogonal code associated with the wireless device.

Example 14. The apparatus of any of examples 12-13 wherein causing the apparatus to modulate and reflect comprises causing the apparatus to: reflect at least part of the received ambient OFDM symbol, and perform active load modulation for an antenna of the wireless device to modulate at least part of the reflected ambient OFDM symbol.

Example 15. The apparatus of any of examples 12-14 wherein the modulating comprises at least: modulating the cyclic prefix at the first portion of the ambient OFDM symbol with data.

Example 16. The apparatus of any of examples 12-15 wherein the causing the apparatus to modulate further comprises causing the apparatus to: modulate the second portion of the ambient OFDM symbol with an orthogonal code associated with the wireless device.

Example 17. The apparatus of any of examples 12-16 wherein causing the apparatus to modulate comprises at least causing the apparatus to: modulate the second portion of the ambient OFDM symbol with data.

Example 18. The apparatus of any of examples 12-17 wherein the causing the apparatus to modulate further comprises causing the apparatus to: modulate the cyclic prefix at the first portion of the ambient OFDM symbol with an orthogonal code associated with the wireless device.

Figure 7:
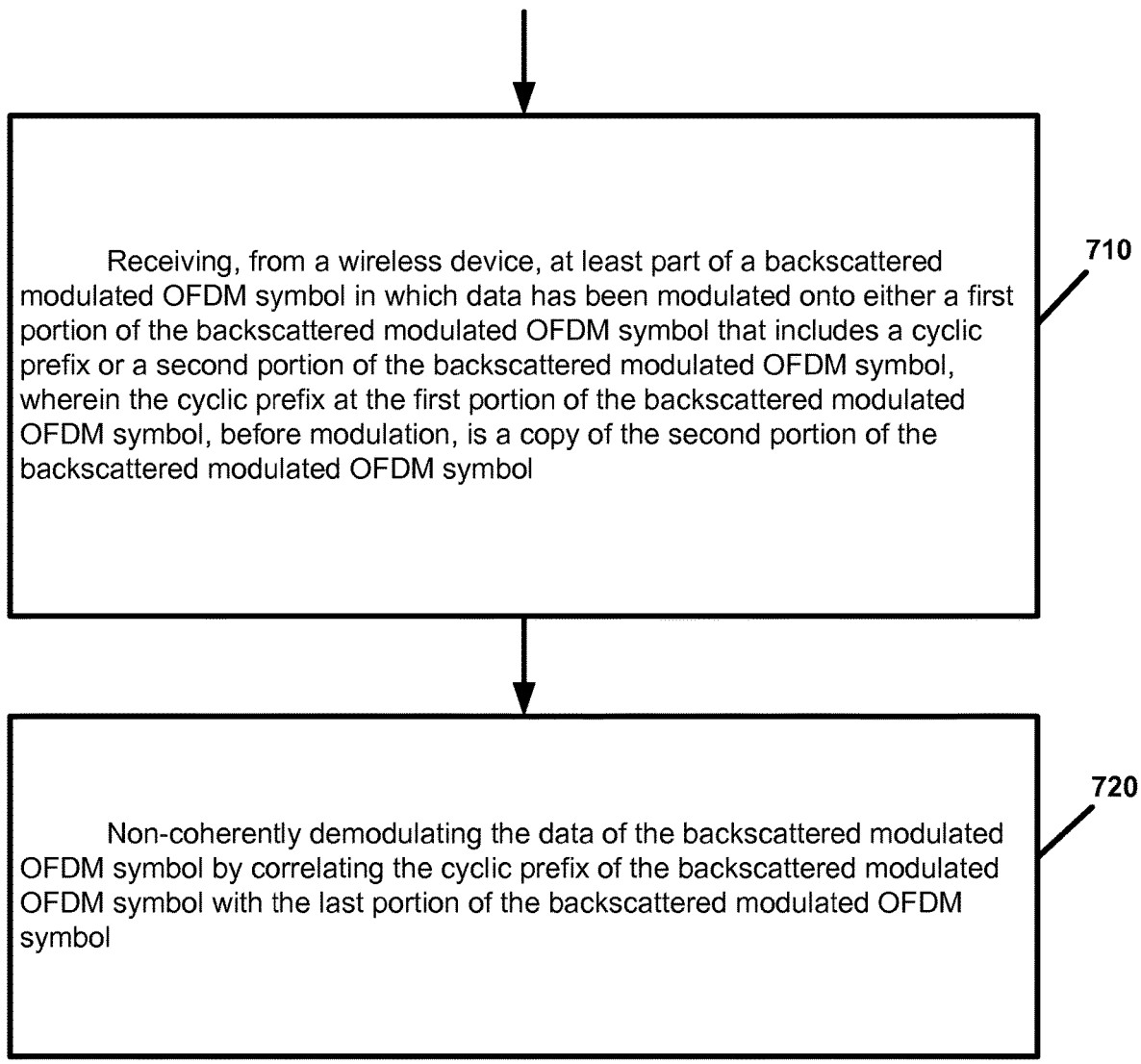
FIG. 7 is a flow chart illustrating a method of non-coherent demodulation of an ambient backscatter signal according to an example embodiment.

Example 19. FIG. 7 is a flow chart illustrating a method of non-coherent demodulation of an ambient backscatter signal according to an example embodiment. Operation 710 includes receiving, from a wireless device, at least part of a backscattered modulated OFDM symbol in which data has been modulated onto either a first portion of the backscattered modulated OFDM symbol that includes a cyclic prefix or a second portion of the backscattered modulated OFDM symbol, wherein the cyclic prefix at the first portion of the backscattered modulated OFDM symbol, before modulation, is a copy of the second portion of the backscattered modulated OFDM symbol. And, operation 720 includes non-coherently demodulating the data of the backscattered modulated OFDM symbol by correlating the cyclic prefix of the backscattered modulated OFDM symbol with the last portion of the backscattered modulated OFDM symbol.

Example 20. The method of example 19 wherein one of the first portion or the second portion of the backscattered modulated OFDM symbol, which is not modulated with data, has been modulated with an orthogonal code associated with the wireless device.

Example 21. The method of any of examples 19-20: wherein the receiving comprises receiving, from a wireless device, a backscattered modulated OFDM symbol in which data has been modulated onto the cyclic prefix at the first portion of the backscattered modulated OFDM symbol, and wherein the cyclic prefix before modulation is a copy of the second portion of the backscattered modulated OFDM symbol; and, wherein the non-coherently demodulating comprises non-coherently demodulating the data of the backscattered modulated OFDM symbol by correlating the modulated cyclic prefix of the backscattered modulated OFDM symbol with the second portion of the backscattered modulated OFDM symbol.

Example 22. The method of any of examples 19-21 and further comprising performing the following before correlating the modulated cyclic prefix of the backscattered modulated OFDM symbol with the second portion of the backscattered modulated OFDM symbol: and, multiplying the second portion of the backscattered modulated OFDM symbol with an orthogonal code to determine an identity of the wireless device.

Example 23. An apparatus comprising at least one processor and at least one memory including computer instructions, when executed by the at least one processor, cause the apparatus to: receive, from a wireless device, at least part of a backscattered modulated OFDM symbol in which data has been modulated onto either a first portion of the backscattered modulated OFDM symbol that includes a cyclic prefix or a second portion of the backscattered modulated OFDM symbol, wherein the cyclic prefix at the first portion of the backscattered modulated OFDM symbol, before modulation, is a copy of the second portion of the backscattered modulated OFDM symbol; and non-coherently demodulate the data of the backscattered modulated OFDM symbol by correlating the cyclic prefix of the backscattered modulated OFDM symbol with the last portion of the backscattered modulated OFDM symbol.

Example 24. An apparatus comprising at least one processor and at least one memory including computer instructions, when executed by the at least one processor, cause the apparatus to: receive, from a wireless device, at least part of a backscattered modulated OFDM symbol in which data has been modulated onto the cyclic prefix of the backscattered modulated OFDM symbol, and wherein the cyclic prefix before modulation is a copy of a last portion of the backscattered modulated OFDM symbol; and non-coherently demodulate the data of the backscattered modulated OFDM symbol by correlating the modulated cyclic prefix of the backscattered modulated OFDM symbol with the last portion of the backscattered modulated OFDM symbol.

Example 25. An apparatus comprising means for performing a method of any of examples 1-11 and 19-22.

Example 26. A computer program product for a computer, comprising software code portions for performing the steps of any of examples 1-11 and 19-22 when said product is run on the computer.

Example 27. An apparatus comprising at least one processor and at least one memory including computer instructions, when executed by the at least one processor, cause the apparatus to perform a method of any of examples 1-11 and 19-22.

Figure 8:
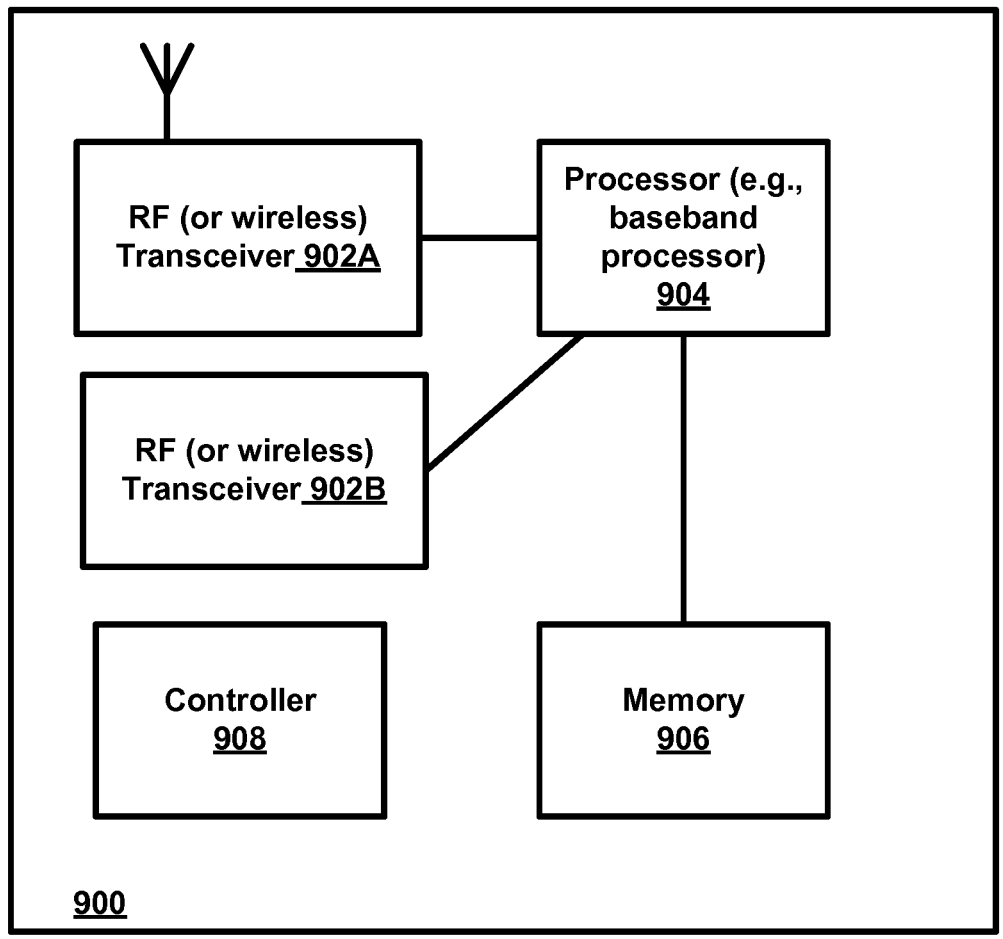
FIG. 8 is a block diagram of a node or wireless node or station (e.g., base station/access point or mobile station/user device/UE or other node) according to an example implementation.

FIG. 8 is a block diagram of a wireless station (e.g., AP, eNB/gNB, BC node, or user device) 900 according to an example implementation. The wireless station 900 may include, for example, one or two RF (radio frequency) or wireless transceivers 902A, 902B, where each wireless transceiver includes a transmitter to transmit signals and a receiver to receive signals. The wireless station also includes a processor or control unit/entity (controller) 904 to execute instructions or software and control transmission and receptions of signals, and a memory 906 to store data and/or instructions.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 8, a controller (or processor) 908 may execute software and instructions, and may provide overall control for the station 900, and may provide control for other systems not shown in FIG. 8, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example implementation, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD- ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method of non-coherent ambient backscatter communication comprising:
   receiving, by a wireless device, an ambient orthogonal frequency-division multiplexing (OFDM) symbol that includes a cyclic prefix at a first portion of the OFDM symbol that is a copy of a second portion of the OFDM symbol;
   modulating, by the wireless device, at least part of the received ambient OFDM symbol, including:
      modulating either the first portion or the second portion of the ambient OFDM symbol with data; and
      modulating one of the first portion or the second portion of ambient OFDM symbol, which is not modulated with data, with an orthogonal code; and
   reflecting, by the wireless device, at least the first portion and the second portion of the modulated OFDM symbol.

2. The method of claim 1 wherein the orthogonal code is associated with the wireless device.

3. The method of claim 1 wherein the modulating at least part of the received ambient OFDM symbol comprises:
   performing active load modulation to modulate at least part of the ambient OFDM symbol.

4. The method of claim 1 wherein the modulating and reflecting comprise:
   reflecting at least part of the received ambient OFDM symbol, and performing active load modulation for an antenna of the wireless device to modulate at least part of the reflected ambient OFDM symbol.

5. The method of claim 1 wherein non-coherent demodulation of the data of the backscattered OFDM symbol may be performed based on a correlation of the cyclic prefix at the first portion of the modulated OFDM symbol with the second portion of the modulated OFDM symbol, without requiring use of channel estimation.

6. An apparatus comprising at least one processor and at least one memory including computer instructions, when executed by the at least one processor, cause the apparatus to:
   receive, by a wireless device, an ambient orthogonal frequency-division multiplexing (OFDM) symbol that includes a cyclic prefix at a first portion of the OFDM symbol that is a copy of a second portion of the OFDM symbol;
   modulate, by the wireless device, at least part of the received ambient OFDM symbol, including:
      modulate either the first portion or the second portion of the ambient OFDM symbol with data; and
      modulate one of the first portion or the second portion of ambient OFDM symbol, which is not modulated with data, with an orthogonal code; and
   reflect, by the wireless device, at least the first portion and the second portion of the modulated OFDM symbol.

7. The apparatus of claim 6 wherein the orthogonal code is associated with the wireless device.

8. The apparatus of claim 6 wherein being configured to cause the apparatus to modulate and reflect comprises being configured to cause the apparatus to:
   reflect at least part of the received ambient OFDM symbol, and perform active load modulation for an antenna of the wireless device to modulate at least part of the reflected ambient OFDM symbol.

9. The apparatus of claim 6 wherein being configured to cause the apparatus to modulate either the first portion or the second portion of the ambient OFDM symbol with data comprises being configured to cause the apparatus to modulate the cyclic prefix at the first portion of the ambient OFDM symbol with data.

10. The apparatus of claim 6 wherein being configured to cause the apparatus to modulate one of the first portion or the second portion of ambient OFDM symbol, which is not modulated with data, with an orthogonal code comprises being configured to cause the apparatus to:
   modulate the second portion of the ambient OFDM symbol with an orthogonal code associated with the wireless device.

11. The apparatus of claim 6 wherein being configured to cause the apparatus to modulate one of the first portion or the second portion of ambient OFDM symbol, which is not modulated with data, with an orthogonal code comprises being configured to cause the apparatus to:
   modulate the second portion of the ambient OFDM symbol with data.

12. The method of claim 6 wherein being configured to cause the apparatus to modulate one of the first portion or the second portion of ambient OFDM symbol, which is not modulated with data, with an orthogonal code comprises being configured to cause the apparatus to:
   modulate the cyclic prefix at the first portion of the ambient OFDM symbol with an orthogonal code associated with the wireless device.

13. An apparatus comprising at least one processor and at least one memory including computer instructions, when executed by the at least one processor, cause the apparatus to:
   receive, from a wireless device, at least part of a backscattered modulated OFDM symbol in which data has been modulated onto either a first portion of the backscattered modulated OFDM symbol that includes a cyclic prefix or a second portion of the backscattered modulated OFDM symbol, wherein the cyclic prefix at the first portion of the backscattered modulated OFDM symbol, before modulation, is a copy of the second portion of the backscattered modulated OFDM symbol;

non-coherently demodulate the data of the backscattered modulated OFDM symbol by correlating the cyclic prefix of the backscattered modulated OFDM symbol with the second portion of the backscattered modulated OFDM symbol.

14. The apparatus of claim 13 wherein one of the first portion or the second portion of the backscattered modulated OFDM symbol, which is not modulated with data, has been modulated with an orthogonal code associated with the wireless device.

15. The apparatus of claim 13:
wherein the apparatus being configured to cause the apparatus to receive comprises being configured to cause the apparatus to receive, from a wireless device, a backscattered modulated OFDM symbol in which data has been modulated onto the cyclic prefix at the first portion of the backscattered modulated OFDM symbol, and wherein the cyclic prefix before modulation is a copy of the second portion of the backscattered modulated OFDM symbol;

wherein being configured to cause the apparatus to non-coherently demodulate comprises being configured to cause the apparatus to non-coherently demodulate the data of the backscattered modulated OFDM symbol by correlating the modulated cyclic prefix of the backscattered modulated OFDM symbol with the second portion of the backscattered modulated OFDM symbol.

16. The apparatus of claim 15 and further being configured to cause the apparatus to perform the following before correlating the modulated cyclic prefix of the backscattered modulated OFDM symbol with the second portion of the backscattered modulated OFDM symbol:

multiplying the second portion of the backscattered modulated OFDM symbol with an orthogonal code to determine an identity of the wireless device.

* * * * *